Patented July 4, 1939

2,164,723

UNITED STATES PATENT OFFICE 2,164,723

EMULSIONS

Walther Schrauth, Berlin-Dahlem, and Kurt Stickdorn, Dessau-Rosslau, Anhalt, Germany, assignors to Deutsche Hydrierwerke Aktiengesellschaft, Berlin-Charlottenburg, Germany, a corporation of Germany No Drawing. Application April 10, 1936, Serial No. 73,803. In Germany April 13, 1935

5 Claims. (Cl. 252—6)

This invention relates to novel emulsions and more particularly to hydrous salves and creams which are useful as bases for therapeutic and cosmetic substances.

This invention has as an object the preparation of novel emulsions. A further object is to use resin alcohols and their esters in the preparation of emulsions. Other objects will appear hereinafter.

These objects are accomplished by the following invention which is based upon the discovery that products of alcoholic character which are obtainable from naturally occurring resins by means of reduction, and their derivatives, are especially qualified to convert many substances into hydrous salves, pastes, or emulsions which can advantageously be used for therapeutic, cosmetic, or technical purposes. Among the substances which can be thus emulsified are; fats, oils, the higher aliphatic alcohols, alcohols derived from waxes, natural or synthetic waxes, paraffin, petrolatum, mineral waxes, Japan wax, hardened castor oil, hardened rape seed oil, monostearin, wax esters, etc. These resin alcohols are especially suitable for combination with substances which are hydrophile such as the higher aliphatic alcohols, alcohols derived from waxes, and monoglycerides of the higher fatty acids. The capacity of the substances just mentioned for absorbing water, and their capability of being emulsified by means of emulsifying agents, are considerably improved by the addition of resin alcohols. Several of the substances mentioned can be worked into stable creams with water. When such substances are emulsified along with resin alcohols, it is found that hydrous creams and pastes are obtained which are more stable and of smoother consistency.

Mixtures resembling wool fat in character can be produced by a combination of the above mentioned hydroxyl-containing wax-like substances with resin alcohols or their derivatives with the optional addition of paraffin, etc. Such mixtures, when triturated with water, yield white salves of a pleasant odor to which any desired medicinal or cosmetic substance may be added.

By adding suitable emulsifying agents and hot water to these mixtures, in a mixing apparatus, there may be obtained emulsions and creams of various consistencies. These emulsions are stable to temperature and are useful for various purposes; generally, appropriate medicinal or cosmetic substances are added thereto.

The resin alcohols employed in these emulsions are obtained by the high pressure catalytic hydrogenation of natural resins of botanical origin such as colophony, dammar, copal, etc. The term "resin alcohols", as employed throughout the specification and claims, shall be construed as limited to those alcoholic substances of the structure produced from said natural resins by the immediately foregoing process. Instead of these resin alcohols, use may be made of their ethers or their acid, neutral, or neutralized esters formed with monobasic or polybasic acids such as the fatty acids of linseed oil, hydroxy stearic acid, benzoic acid, salicylic acid, succinic acid, tartaric acid, citric acid, boric acid, sulphuric acid, phosphoric acid, etc.

The following examples, in which parts are by weight, illustrate but do not limit the invention.

Example 1

A transparent resin alcohol is prepared from technical colophony by catalytic high pressure reduction which has an acetyl saponification number of 166 and a melting point of 60° C. A stable resin alcohol emulsion is prepared by permitting 20 parts of concentrated sulphuric acid to react slowly at 65° C. with 280 parts of said resin alcohol. The reaction mixture is stirred constantly during the course of the reaction. The partially formed sulphuric acid ester of the resin alcohol is neutralized with dilute soda lye, and more water is added to the emulsion. This emulsion can have added thereto appropriate therapeutic or cosmetic agents.

Example 2

50 parts of the saturated alcohols obtained by the reduction of beeswax, 45 parts of a fatty alcohol mixture containing tetradecyl, cetyl, and octadecyl alcohols, and 55 parts of the resin alcohol described in Example 1 are combined by melting. This preparation is worked up in an emulsification machine with approximately twice the quantity of warm water and subsequently stirred in the cold. By this procedure, a smooth non-adhesive salve base is obtained which may be considerably extended with petrolatum. Pharmaceutically or cosmetically effective substances can be made by adding ethereal oils, medicinal substances, etc., to this salve base.

Example 3

3 parts of sodium cetyl sulphate are dissolved at 90° C. in a melt consisting of 200 parts of a mixture of about equal parts of cetyl alcohol and octadecyl alcohol, and 100 parts of the resin alcohol described in Example 1. 40 parts of petrolatum and 120 parts of hot water are added to 20 parts of this mixture in an emulsification machine. By this procedure, there is obtained an emulsion which, when cooled and perfumed, is an excellent skin cream. Very stable creams of similar quality can be obtained by substituting solid paraffin or spermaceti for the petrolatum used in the foregoing preparation. This emulsion is capable of absorbing water to an unlimited extent, so that 1% emulsions can be produced which are useful for various technical purposes.

Example 4

An alcohol having an acetyl saponification number of 120 and a melting point of 88° C. is obtained from natural dammar resin by catalytic high pressure hydrogenation. 40 parts of the resin alcohol described in Example 1, 40 parts of the aforesaid dammar resin alcohol, 40 parts of the fatty alcohol mixture obtained by catalytic hydrogenation of hardened rape seed oil, and 1.2 parts of sodium cetyl sulphonate are melted together. A salve base is obtained by emulsifying this mixture with 240 parts of water.

In place of the resin alcohol obtained from colophony, use may be made of its glycerin ether, its salicylic acid ester, or its hydroxy stearic acid ester. The resin alcohol obtained by the high pressure hydrogenation of Manila copal may be substituted for either of the resin alcohols employed in this example.

Example 5

10 parts of aluminum oleate and 2 parts of sodium cetyl sulphate are dissolved in a melt containing 20 parts of cetyl alcohol, 20 parts of the resin alcohol mixture described in Example 4, and 70 parts of flake paraffin. This mixture is worked up with 9,000 parts of hot water to obtain a stable homogeneous emulsion which is well suited for the impregnation of textiles.

Example 6

15 parts of the tri-ethanol amine salt of the phosphoric acid ester of the resin alcohol obtained by the catalytic high pressure hydrogenation of Congo copal are dissolved in 82 parts of hot paraffin oil. 3 parts of nicotine are introduced into the solution while it is lukewarm. A 1-3% aqueous emulsion of this preparation is a very effective agent for combating parasites.

As many apparently widely different embodiments of this invention may be made without departing from the spirit and scope thereof; it is to be understood that the invention is not limited to the specific embodiments thereof except as defined in the appended claims.

We claim:

1. A base for therapeutic and cosmetic compositions comprising a fatty alcohol, water, and a resin alcohol in a quantity which binds the water present and produces a homogeneous compatible mass.

2. Hydrous pastes, salves, and the like comprising a hydrophilic fatty material, water, and a resin alcohol in a quantity which binds the water present and produces a homogeneous compatible mass.

3. Hydrous pastes, salves, and the like comprising wax, water, and a resin alcohol in a quantity which binds the water present and produces a homogeneous compatible mass.

4. Hydrous pastes, salves, and the like comprising a monoglyceride of a higher fatty acid, water, and a resin alcohol in a quantity which binds the water present and produces a homogeneous compatible mass.

5. Hydrous pastes, salves, and the like comprising a hydrophilic fatty material, water, an emulsifying agent, and a resin alcohol in a quantity which binds the water present and produces a homogeneous compatible mass.

WALTHER SCHRAUTH.
KURT STICKDORN.